Aug. 19, 1952     J. JANDASEK     2,607,456
FLUID TRANSMISSION
Filed Oct. 29, 1945
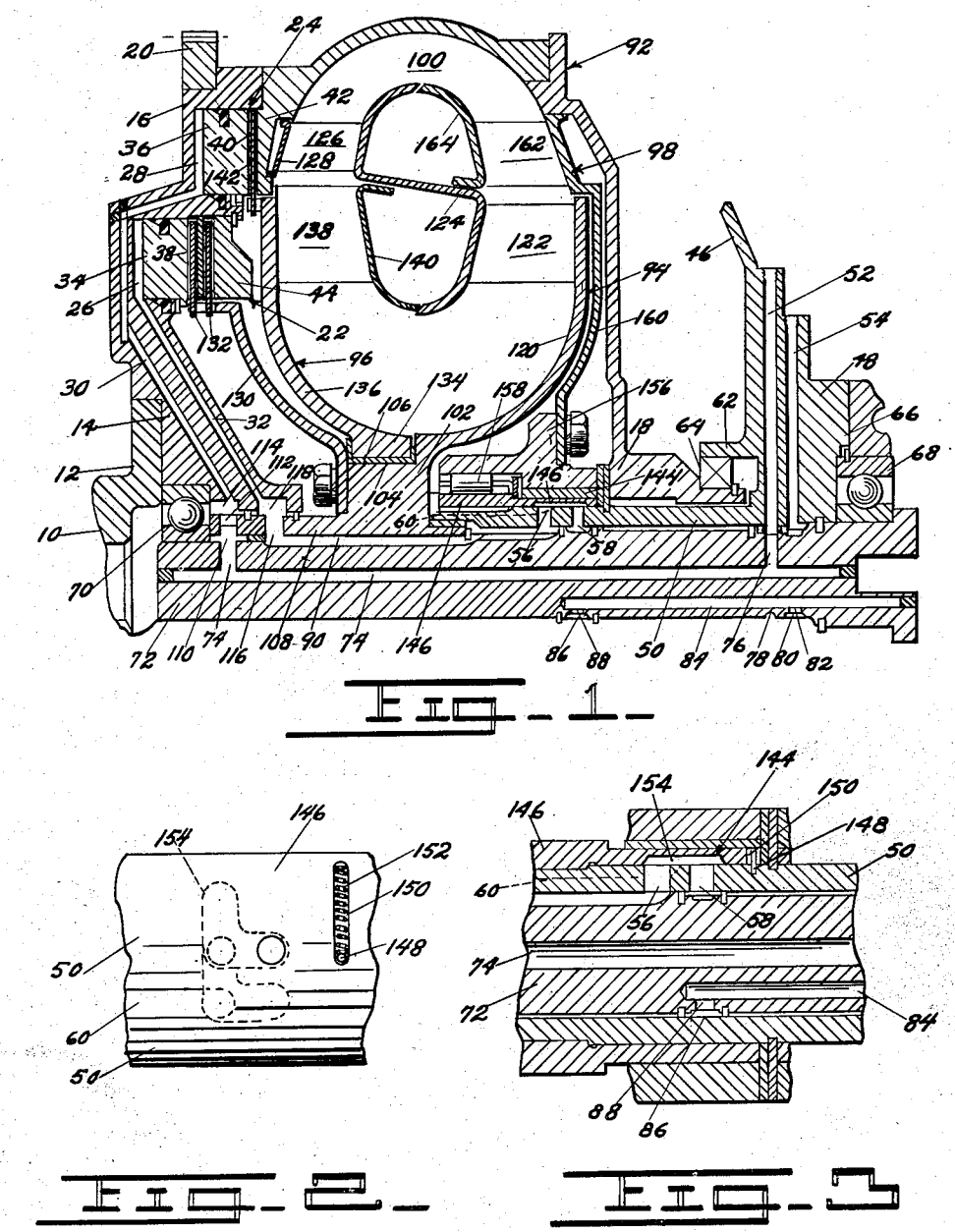
INVENTOR.
JOSEPH JANDASEK
BY
ATTORNEY Patented Aug. 19, 1952

2,607,456

UNITED STATES PATENT OFFICE 2,607,456

FLUID TRANSMISSION

Joseph Jandasek, Detroit, Mich., assignor to Bendix Aviation Corporation, Detroit, Mich., a corporation of Delaware Application October 29, 1945, Serial No. 625,304

7 Claims. (Cl. 192—3.2)

This invention relates to fluid transmissions and more particularly to control means therefor.

Broadly the invention comprehends manually operative fluid pressure means for coupling the impeller of a fluid torque converter to the driving means for the converter and fluid pressure means controlled by the fluid in the circuit of the converter for coupling the turbine of the converter to the driving means.

An object of the invention is to provide means for control of a fluid torque converter including manually operative means for control of the impeller of the converter, and automatically operative means for control of the turbine of the converter.

An object of the invention is to provide control means for a fluid torque converter having an impeller, a turbine and a reaction member, including manually operative fluid pressure actuated means for coupling the impeller to a driving means for the converter and fluid pressure actuated means under control of the reaction member for coupling the turbine to the driving means.

Another object of the invention is to provide a fluid torque converter of compact structure including an impeller, a two-stage turbine and a reaction member and clutches for control of each of these elements.

Other objects and advantages will appear from the following description when taken in connection with the drawings forming a part of this specification and in which—

Fig. 1 is a vertical sectional view partly broken away of a fluid torque converter embodying the invention;

Fig. 2 is a fragmentary view illustrating a valve, and;

Fig. 3 is a fragmentary view further illustrating the valve.

Referring to the drawings for more specific details of the invention 10 represents the crank shaft of an internal combustion engine. The shaft has a flange 12, and a hub 14 suitably secured to the flange supports a housing 16 having a hub 18 arranged in oppositely disposed relation to the hub 14, and suitably secured to the housing is a ring gear 20 for the reception of the driving element of an electrical starter, not shown.

The housing has therein concentrically disposed clutches indicated generally at 22 and 24. As shown, the clutches include annular chambers 26 and 28 concentrically disposed with relation to one another and to the crank shaft 10, and fluid passages 30 and 32 extended through the wall of the housing 16 communicate with the chambers 26 and 28. Annular pistons 34 and 36 mounted for reciprocation in the chambers 26 and 28 and suitably retained against rotation have machined faces constituting axially movable clutch elements 38 and 40. The housing 16 has an annular web overhanging the chamber 28 which provides a fixed clutch element 42 for the clutch 24 and an annular member suitably supported on the housing in overhanging relation to the chamber 26 provides a fixed clutch element 44 for the clutch 22.

A stationary housing 46 for enclosing the housing 16 has a hub 48 rigidly supporting a sleeve 50 extended through the hub 18 into the housing 16 with a suitable bearing interposed between the hub and the sleeve. The hub has radial passages 52 and 54 and the sleeve has radial passages 56 and 58 and a longitudinal channel 60, the purpose of which will hereinafter appear. The hub 48 also has a flange 62 overhanging the hub 18 of the housing 16, and a fluid seal 64 fitted between the hub and the flange inhibits seepage of fluid from the housing 16. The hub 48 also has a bearing support 66 for the reception of a bearing 68 in axial alignment with a bearing 70 fitted in the hub 14 of the housing 16.

A center shaft 72 extended through the sleeve 50 and housing 16 is mounted for rotation on the bearings 68 and 70. The center shaft has an axially disposed passage 74, the purpose of which will hereinafter appear, and also a radially disposed passage 76 and a circumferential groove 78 providing a communication between the passage 76 and the passage 52 in the hub 48, and the passage 52 is adapted to be connected to a manually actuated fluid pressure means, not shown. The center shaft also has a circumferential groove 80 communicating as by a port 82 with a passage 84 extended longitudinally in the shaft. The shaft has another circumferential groove 86 communicating as by a port 88 with the passage 84 and also a passage 90.

A fluid torque converter indicated generally at 92 includes a two-stage turbine 94, and impeller 96 and a reaction member 98, providing in conjunction with one another a fluid circuit 100.

The two-stage turbine includes a hub 102 splined to the center shaft 72. The hub has a shoulder 104 supporting a bearing 106 and a sleeve 108 extended into the hub 14, and the sleeve has an internal groove 110 communicating as by an opening 112 with a groove 114 in the hub providing a communication between the opening 110 and the passage 30. The sleeve also has a radial opening 116, providing a communication between the passage 90 in the center shaft and a groove 118 in the hub in direct communication with the passage 32. The hub 102 supports a web 120 having thereon spaced vanes 122 supporting an inner shroud 124 having arranged thereon spaced vanes 126 supporting an outer shroud 128. The vanes 126 constitute the first stage of the turbine and the vanes 122 constitute the second stage of the turbine. The hub 102 also supports a web 130 carrying a plurality of clutch plates 132 rotatably and axially movable between the clutch plates 38 and 44 with an axially movable clutch plate interposed.

The impeller 96 includes a hub 134 mounted for rotation on the bearing 106 on the shoulder 104 of the turbine. The hub has thereon a web 136 supporting spaced blades 138 which in turn support an inner shroud 140 for cooperation with the inner shroud 124 of the turbine. The web 136 also supports a clutch plate 142 rotatable and axially movable between the clutch plates 40 and 42.

A valve indicated generally at 144 includes a sleeve 146 mounted on the stationary sleeve 50. The sleeve has limited angular movement in both directions of rotation determined by a pin 148 in the stationary sleeve 50 received by a slot 150 in the sleeve 146 and a spring 152 in the slot 150 yieldingly resists movement of the sleeve 146 in one direction of rotation and urges movement of the sleeve in the reverse direction. The sleeve 146 also has an L-shaped slot 154 providing a communication between the ports 56 and 58 when the sleeve is in one position and also a communication between the port 56 and the passage 60 when the sleeve is in another position.

The reaction member 98 includes a hub 156 mounted on the sleeve 146 for free rotation in one direction and held against relative rotation in the reverse direction as by a roller clutch 158 interposed between the hub and the sleeve, and the hub supports a web 160 having arranged thereon spaced vanes 162 supporting an inner shroud 164.

In a normal operation assuming that the driving shaft 10 and accordingly the housing 16 is rotating at low speed, the manually actuated fluid pressure means, not shown, is operated to cause movement of fluid under pressure through the passage 52, the groove 78, the passages 76, 74, 110, the port 112 and passages 114 and 30 into the chamber 28 causing actuation of the piston 36, with the resultant application of the clutch 24 to effectively lock the impeller 96 to the housing 16 for rotation therewith.

Rotation of the impeller 96 results in energization of the fluid in the circuit 100 and the energy of the fluid is received on the vanes 126 and 122 of the first and second stages of the turbine, and also on the vanes 162 of the reaction member. This results in rotation of the turbine 94, and slight rotation of the reaction member 98 to a position where it is held against further rotation in the same direction by the clutch 158.

Under this condition the sleeve 146 is moved through a slight angle to effectively close the valve 144, and power is transmitted with torque multiplication to the center shaft 72.

Upon attaining a speed where torque multiplication is no longer required the direction of fluid flow in the circuit 100 changes. This results in reverse movement of the reaction member 98 and this movement of the reaction member releases the clutch 158 and accordingly the sleeve 146, whereupon the sleeve 146 is urged by the spring 152 to move through a slight angle so as to open the valve 144 whereupon fluid under pressure flows from the fluid pressure means, not shown, through the passage 54, groove 80, port 82, passage 84, groove 86, port 88, the passage 58, slot 154, passage 56, passages 90, 116, groove 118 and passage 32 into the cylinder 26 resulting in application of the clutch 22, so as to lock the turbine 94 to the housing 16, and under this condition a one-to-one ratio drive is accomplished.

Upon a decrease in speed to the extent where torque multiplication is again required, the manually actuated fluid pressure means is again operated so as to apply the clutch 24 and thereby lock the impeller to the housing, whereupon the fluid in the circuit 100 is again energized and the energy of the fluid is received by the turbine 94 and the reaction member 98. This results in movement of the reaction member to its stationary position, and rotation of the turbine. When the reaction member moves to its stationary position where it is held by the clutch 158, the sleeve 146 is moved through a slight angle so as to close the valve 144, whereupon pressure on the fluid in the clutch 22 is released and fluid is returned from the cylinder 26 of the clutch through the passage 32, the groove 118, the passages 90, 116, and the port 56 and the passage 60 to the fluid circuit by way of the clearance between the turbine and the reaction member and under this condition power is transmitted from the turbine to the center shaft with torque multiplication.

While this invention has been described in connection with certain specific embodiment, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A transmission comprising driving and driven shafts, a fluid torque converter on the driven shaft including an impeller, a turbine and a movable reaction member, means for coupling the impeller to the driving shaft and means for coupling the turbine under the influence of the reaction member to the driving shaft.

2. A transmission comprising driving and driven shafts, a fluid torque converter on the driven shaft including an impeller, a turbine and a movable reaction member, fluid pressure actuated means for coupling the impeller to the driving shaft and fluid pressure actuated means under the influence of the reaction member for coupling the turbine to the driving shaft.

3. A transmission comprising driving and driven shafts, a fluid torque converter on the driven shaft including an impeller, a turbine and a movable reaction member, fluid pressure actuated means for coupling the impeller to the driving shaft, and fluid pressure actuated means under control of the reaction member for coupling the turbine to the driving shaft.

4. A transmission comprising driving and driven shafts, a housing on the driving shaft enclosing the driven shaft, a fluid torque converter in the housing including a turbine secured to the driven shaft, an impeller mounted for rotation on the turbine, a reaction member mounted on the driven shaft, fluid pressure actuated means for coupling the impeller to the driving shaft, and means under the influence of the reaction member for coupling the turbine to the driving shaft.

5. A transmission comprising a driving element, and an impeller, a turbine and a movable reaction member providing in conjunction with one another a fluid circuit, fluid pressure actuated means for coupling the impeller to the driving element, and fluid pressure actuated means for automatically coupling the turbine to the driving element upon movement of the reaction member due to reactance of the fluid in the circuit.

6. A transmission comprising driving and driven shafts, a housing carried by the driving shaft enclosing the driven shaft, a fluid torque converter in the housing including a turbine having a hub secured to the driven shaft, an impeller mounted for free rotation on the hub, and a reaction member mounted for free rotation in one direction and held against rotation in the reverse direction, fluid pressure actuated means for coupling the impeller to the driving shaft, and fluid pressure actuated means controlled by movement of the reaction member for coupling the turbine to the driving shaft.

7. A transmission comprising driving and driven shafts, a housing carried by the driving shaft enclosing the driven shaft, a fluid torque converter in the housing including a turbine having a hub secured to the driven shaft, an impeller mounted on the hub for free rotation, and a reaction member mounted for free rotation in one direction and held against rotation in the reverse direction, a fluid pressure actuated clutch for coupling the impeller to the driving shaft and a fluid pressure actuated clutch under control of the reaction member for coupling the turbine to the driving shaft.

JOSEPH JANDASEK.

REFERENCES CITED

The following references are of record in the file of this patent:

UNITED STATES PATENTS

| Number | Name | Date |
|---|---|---|
| 1,689,245 | Klimek | Oct. 30, 1928 |
| 1,993,741 | Jandasek | Mar. 12, 1935 |
| 2,093,498 | Walti | Sept. 21, 1937 |
| 2,129,366 | Swennes | Sept. 6, 1938 |
| 2,226,802 | Black | Dec. 31, 1940 |
| 2,235,418 | Buchhart | Mar. 18, 1941 |
| 2,296,642 | Huebner | Sept. 22, 1942 |
| 2,301,451 | Pollard | Nov. 10, 1942 |
| 2,324,693 | Griswold et al. | July 20, 1943 |
| 2,347,121 | Patterson | Apr. 18, 1944 |
| 2,351,483 | Carnagua | June 13, 1944 |
| 2,360,710 | Nutt et al. | Oct. 17, 1944 |
| 2,480,933 | Jandasek | Sept. 6, 1949 |